United States Patent [19]

Richeson, Jr.

[11] Patent Number: 4,794,890

[45] Date of Patent: Jan. 3, 1989

[54] ELECTROMAGNETIC VALVE ACTUATOR

[75] Inventor: William E. Richeson, Jr., Fort Wayne, Ind.

[73] Assignee: Magnavox Government and Industrial Electronics Company, Fort Wayne, Ind.

[21] Appl. No.: 21,195

[22] Filed: Mar. 3, 1987

[51] Int. Cl.$^4$ .......................... F01L 9/04; F16K 31/08

[52] U.S. Cl. .................................... 123/90.11; 251/54; 251/64; 251/65; 251/129.1

[58] Field of Search .................. 123/90.11; 251/129.1, 251/54, 65, 64

[56] References Cited

U.S. PATENT DOCUMENTS

| | | | |
|---|---|---|---|
| 2,923,521 | 2/1960 | Ray | 251/54 |
| 3,036,808 | 5/1962 | Fox | 251/54 |
| 3,383,084 | 5/1968 | Mayfield | 251/129.1 |
| 3,814,376 | 6/1974 | Reinicke | 251/129.1 |
| 3,853,102 | 12/1974 | Myers et al. | 123/90.49 |
| 3,882,833 | 5/1975 | Longstaff et al. | 123/90.11 |
| 4,000,756 | 1/1977 | Ule et al. | 137/596.17 |
| 4,009,695 | 3/1977 | Ule | 123/90.13 |
| 4,392,632 | 7/1983 | Gast et al. | 251/65 |
| 4,455,543 | 6/1984 | Pischinger et al. | 335/266 |
| 4,512,549 | 4/1985 | Gast et al. | 251/129.1 |
| 4,515,343 | 5/1985 | Pischinger et al. | 123/90.11 |
| 4,544,986 | 10/1985 | Büchl | 123/90.11 |

*Primary Examiner*—Andrew M. Dolinar

*Attorney, Agent, or Firm*—Roger M. Rickert; Thomas A. Briody; Richard T. Seeger

[57] ABSTRACT

A bistable electromechanical transducer is disclosed having an armature reciprocable between first and second positions, a permanent magnet latching arrangement for maintaining the armature in the respective positions, and an electromagnetic repulsion arrangement operable when energized to dislodge the armature from the position in which the armature was maintained and causing it to move to the other of the positions. In a preferred embodiment, the transducer takes the form of an electronically controllable valve mechanism for use in an internal combustion engine and has an engine valve with an elongated valve stem along with the electromagnetic repulsion arrangement for causing the valve to move in the direction of stem elongation between valve-open and valve-closed positions. An arrangement for decelerating the valve as the valve nears the respective valve-open and valve-closed positions includes at least two separate damping arrangements jointly effective to slow valve motion as the valve gets close to said one position. The damping may include dynamic breaking and energy recovery. The mechanism may also include a housing at least partially surrounding the valve stem and an arrangement for circulating the engine liquid coolant through a portion of the housing.

24 Claims, 6 Drawing Sheets

ELECTROMAGNETIC VALVE ACTUATOR

SUMMARY OF THE INVENTION

The present invention relates generally to bistable electromechanical transducers and more particularly to a fast acting electromagnetic actuator having two stable or latched states and switchable on command from either one of those states to the other. The invention could also be described as a bistable reciprocating electric motor having a very short transition time. This actuator finds particular utility in opening and closing the gas exchange, i.e., intake or exhaust, valves of an otherwise conventional internal combustion engine. Due to its fast acting trait, the valves may be moved between full open and full closed positions almost immediately rather than gradually as is characteristic of cam actuated valves. Further, being electrically actuated, the time in the cycle when the valves ar opened and closed may be independently controlled for enhanced efficiency and reduced pollution. The actuator mechanism may find numerous other applications such as in compressor valving and valving in other hydraulic or pneumatic devices, or as a fast acting control valve for hydraulic actuators.

Internal combustion engine valves are almost universally of a poppet type which are spring loaded toward a valve-closed position and opened against that spring bias by a cam on a rotating cam shaft with the cam shaft being synchronized with the engine crankshaft to achieve opening an closing at preferred times in the engine cycle. This fixed timing is a compromise between the timing best suited for high engine speed and the timing best suited to lower speeds or engine idling speed.

The prior art has recognized numerous advantages which might be achieved by replacing such cam actuated valve arrangements with some other type valve opening mechanism which could be controlled in its opening and closing as a function of engine speed as well as engine crankshaft angular position. For example, U.S. Pat. No. 4,009,695 discloses hydraulically actuated Valves in turn controlled by spool valves which are themselves controlled b a dashboard computer which monitors a number of engine operating parameters. This patent references many advantages which could be achieved by such independent valve control.

Other attempts to replace the conventional cam actuated valve have included solenoid actuated valves; solenoid controlled hydraulic valve openers; individual cams, one for opening and one for closing the valve; and several schemes having as their primary goal the deactivation of one or more engine cylinders dependent upon engine demand.

These prior art attempts have not been effective and have therefor failed to achieve the recognized goals for at least the following reasons: Solenoids operate on magnetic attraction principles where the force of attraction is inversely proportional to the square of distance and are slow in operation because the initial forces are low and solenoid electrical induction is large. Hydraulic valve actuators and especially control valves for such actuators are slow or sluggish in response and fail to open and close the valve quickly without the use of high hydraulic pressures. Multiple cams for each valve require multiple cam shafts and a complex mechanical arrangement or servomechanism to control the relative timing of those cams, all leading to higher costs, reduced reliability and often slower than the desired action.

Among the several objects of the present invention may be noted the provision of an electronically controllable valve mechanism capable of achieving the heretofor recognized but unattained advantages of independent valve timing control; the provision of a bistable electromechanical transducer characterized by short transition time between its stable states; the provision of an electromagnetic repulsion arrangement for a bistable transducer; the provision of a magnetic latching arrangement for a bistable electromechanical transducer; and the provision of an electronically controllable valve mechanism which combines rapid action with damping to slow motion near the end of its travel. These as well as other objects and advantageous features of the present invention will be in part apparent and in part pointed out hereinafter.

In general, an electronically controllable valve mechanism for use in an internal combustion engine has a engine valve with an elongated valve stem along with motive means employing electromagnetic repulsion principles for causing the valve to move in the direction of stem elongation between valve-open and valve-closed positions and an arrangement for decelerating the valve as the valve nears one of said valve-open and valve-closed positions including at least two separate damping arrangements jointly effective to slow valve motion as the valve gets close to said one position. The mechanism may include a housing at least partially surrounding the valve stem and an arrangement for circulating the engine liquid coolant through a portion of the housing.

Also in general and in one form of the invention, a bistable electromechanical transducer has an armature reciprocable between first and second positions, a permanent magnet latching arrangement for maintaining the armature in one of said positions, and an electromagnetic repulsion arrangement operable when energized to dislodge the armature from the position in which the armature was maintained.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
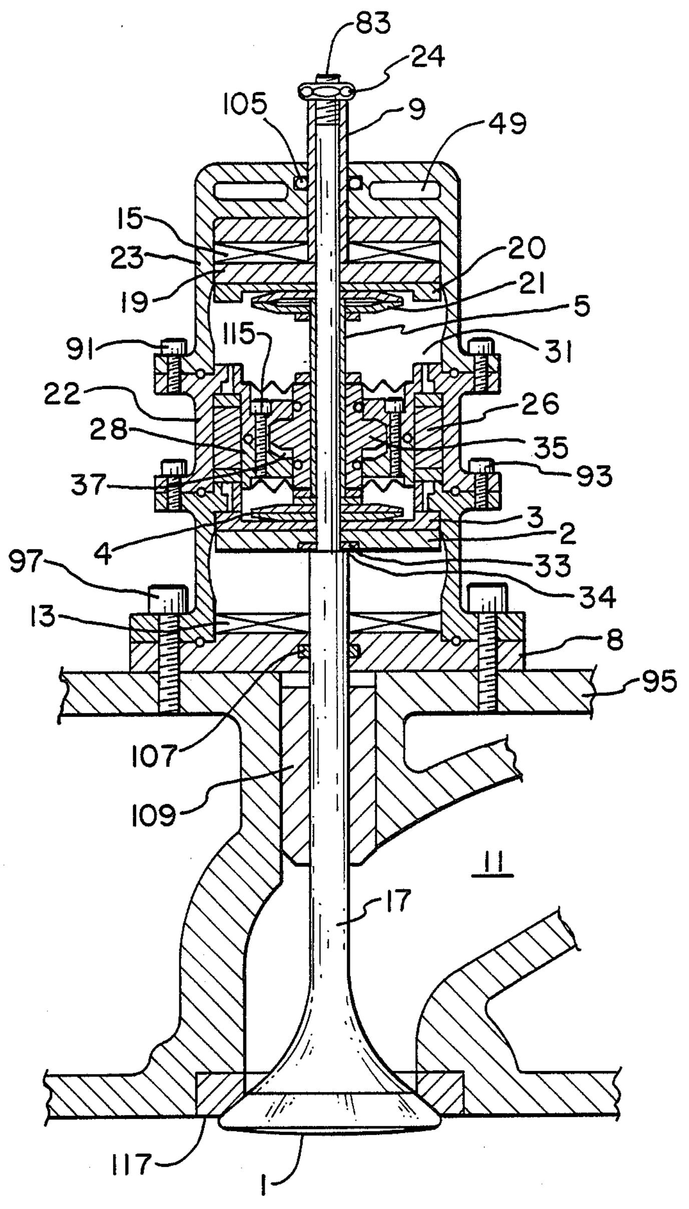
FIG. 1 is a view in cross-section of a portion of an internal combustion engine incorporating the present invention in one form.

Referring generally to FIG. 1, the mechanism for actuation a single valve 1, for example, to open and close an engine exhaust port 11 is shown. The mechanism includes a pair of individually energizable electromagnet coils 13 and 15 in fixed locations within housing 23. Valve stem 17 carries a pair of copper or other highly conductive, nonmagnetic plates 2 and 19. Adjacent these copper plates are a pair of iron or other ferromagnetic plates 8 and 20 which are in turn backed by a pair of axially resilient disk springs 4 and 21. A fixed radially polarized annular permanent magnet 26 provides by way of iron pole pieces 22 and 28, a very strong magnetic field across the small gap 31. A damping piston 35 which allows fluid to migrate between chamber 87 and a similar chamber formed above piston 85 when it moves downwardly slows valve movement near the ends of its travel The valve is shown in its closed position in FIG. 1. To open the valve, a strong pulse of current is applied to coil 15 which induces a current flow in copper plate 19 in a direction to create a repulsive magnetic force between the coil and the plate. A similar phenomenon has been employed in so-called repulsion motors. This force kicks plate 19, the stem 17 and other stem supported parts downwardly rapidly. Here the abovenoted inverse square law works to advantage since the initial separation is negligible and the initial force very high. Near the end of the downward travel, spring disk 21 engages piston 35 providing both spring and hydraulic damping or slowing of the stem motion. Shortly thereafter, iron plate 20 contacts the pole pieces 22 and 28 and the strong permanent magnetic field near the gap 31 locks the valve in the open position. This locking is later overcome by energizing coil 13 forcing copper plate 2 upward to close the valve.

Since gap 31 is small, the force of attraction between pole pieces 22, 28 and the plate 20 falls off rapidly with distance. Further, coil 13 and plate 2 are very close together when coil 13 is pulsed. This gives a very large initial force of repulsion and thereafter the valve moves at nearly constant speed throughout its travel.

Figure 2:
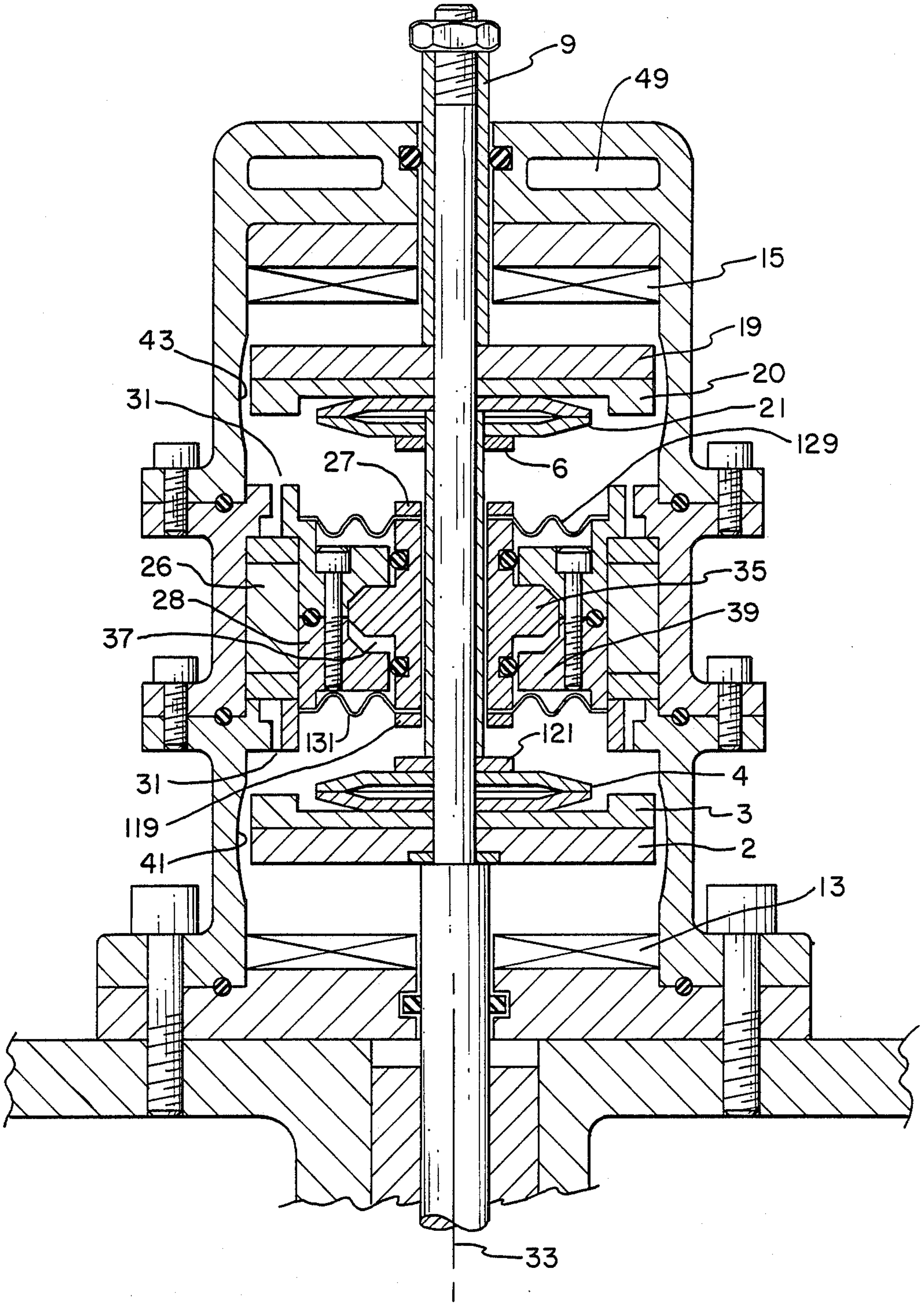
FIG. 2 is a view in cross-section of the upper electromechanical transducer portion of FIG. 1, but showing the armature or valve stem in an intermediate position.
Figure 4:
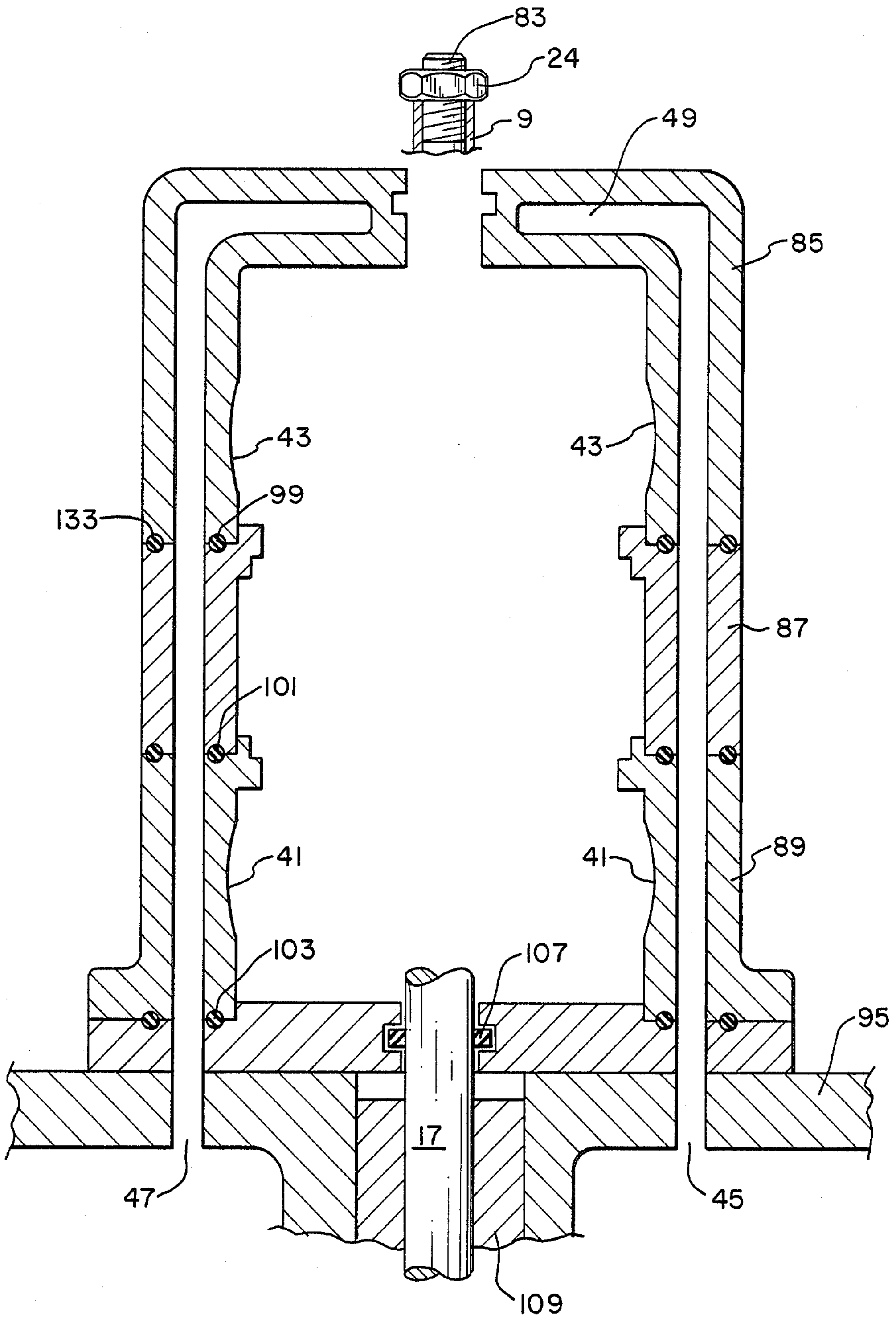
FIG. 4 is a view in cross-section of the housing portion only of FIGS. 1–8 and rotated 90 degrees therefrom.

Referring now in greater detail to FIG. 2, an electronically controllable valve mechanism for use in an internal combustion engine is seen to include an engine valve having an elongated axial stem 17, a housing 28 at least partially surrounding the valve stem 17 with that housing having a hollow interior generally shaped as a surface of revolution about the axis 83 of the valve stem, compare FIGS. 2 and 4. Several components are included within the housing 28 and surrounding the valve stem 17 for moving the valve 1 along the stem axis 33 between valve-open and valve-closed positions including in order along the stem; a first annular coil 13 fixed relative to the housing 23, a first conductor 2 of copper or other conductive, but nonmagnetic material fixed to the valve stem 17, a first spring damping device in the form of a spring disk 4, a hydraulic damping device including a fluid filled cavity 37 defining enclosure 39 fixed to the housing and a piston 35 movable independent of the valve stem 17 within the cavity 37, a second spring damping device 21 similar to the spring 4, a second conductor 19 similar to conductor 2 fixed to the valve stem 17, and a second annular coil 15 similar to coil 13 fixed relative to the housing 23.

Included within the valve housing are several components for providing valve damping or slowing of valve motion as the valve nears either of its open or closed positions. This means for decelerating the valve as the valve nears one of said valve-open and valve-closed positions includes three separate damping arrangements which are jointly effective to slow valve motion as the valve gets close to one of its end positions. One of said damping arrangements comprises the axially compressible annular spring disks or washers 4 and 21. In the valve-closed position, the annular spring 4 is strained to assure that the valve is held tightly in the valve-closed position so as to compensate for relative thermal expansion of the valve stem 17 and insure valve closure. Another one of said damping arrangements comprises a pneumatic damping arrangement including a housing region of reduced size above and below regions 41 and 43 and a piston fixed to the valve stem which enters the region of reduced size as the valve nears one of said valve-open and valve-closed positions. The piston may comprise one of the conductor disks 2 and 19 and/or the ferromagnetic disks 8 and 20. Note how the housing is widened in regions 41 and 48 to relieve this pneumatic damping during all but the very last portion of valve stroke. A further one of said damping arrangements comprises a hydraulic damping arrangement including the fixed fluid filled cavity 37 and the piston 35 which is movable a short distance independent of the valve stem 17. The piston is impacted and driven from one cavity extreme to another cavity extreme as the valve nears one of said valve-open and valve-closed positions.

Several further components are included within housing 23 for latching the valve in either the valve-open or valve-closed position. In a preferred form, this latching arrangement for maintaining the valve in one of said valve-open and valve-closed positions includes a radially polarized permanent magnet 26 and associated pole pieces 22 and 28 fixed to the housing intermediate the first and second conductors 2 and 19 respectively, and first and second ferromagnetic members 3 and 20 fixed to and movable with the valve stem 17 with the valve being held in the valve-closed position by magnetic attraction between the magnet and the first ferromagnetic member 3 and in the valve-open position by magnetic attraction between the magnet and the second ferromagnetic member 20. As noted, the permanent magnet 26 is an annular member radially magnetized the field of which passes through inner and outer ferromagnetic pole pieces 28 and 22 respectively to define a first or lower small annular air gap magnetic field 31 which is shunted by the first ferromagnetic member 3 when the valve is in the valve-closed position (FIG. 1) and a second or upper small annular air gap magnetic field 31 which is shunted by the second ferromagnetic member 20 when the valve is in the valve-open position (FIG. 3).

Thus, the first coil 13 and first conductor 2 are in juxtaposition when the valve is in the valve-open position (FIG. 8) and the second coil 15 and second conductor 19 are juxtaposed when the valve is in the valve-closed position (FIG. 1). The electromagnetic repulsion arrangement is operable when energized, for example, by the circuitry of FIGS. 5 or 6 to override the permanent magnet latching arrangement and dislodge the valve from the position in which the valve was maintained.

Figure 3:
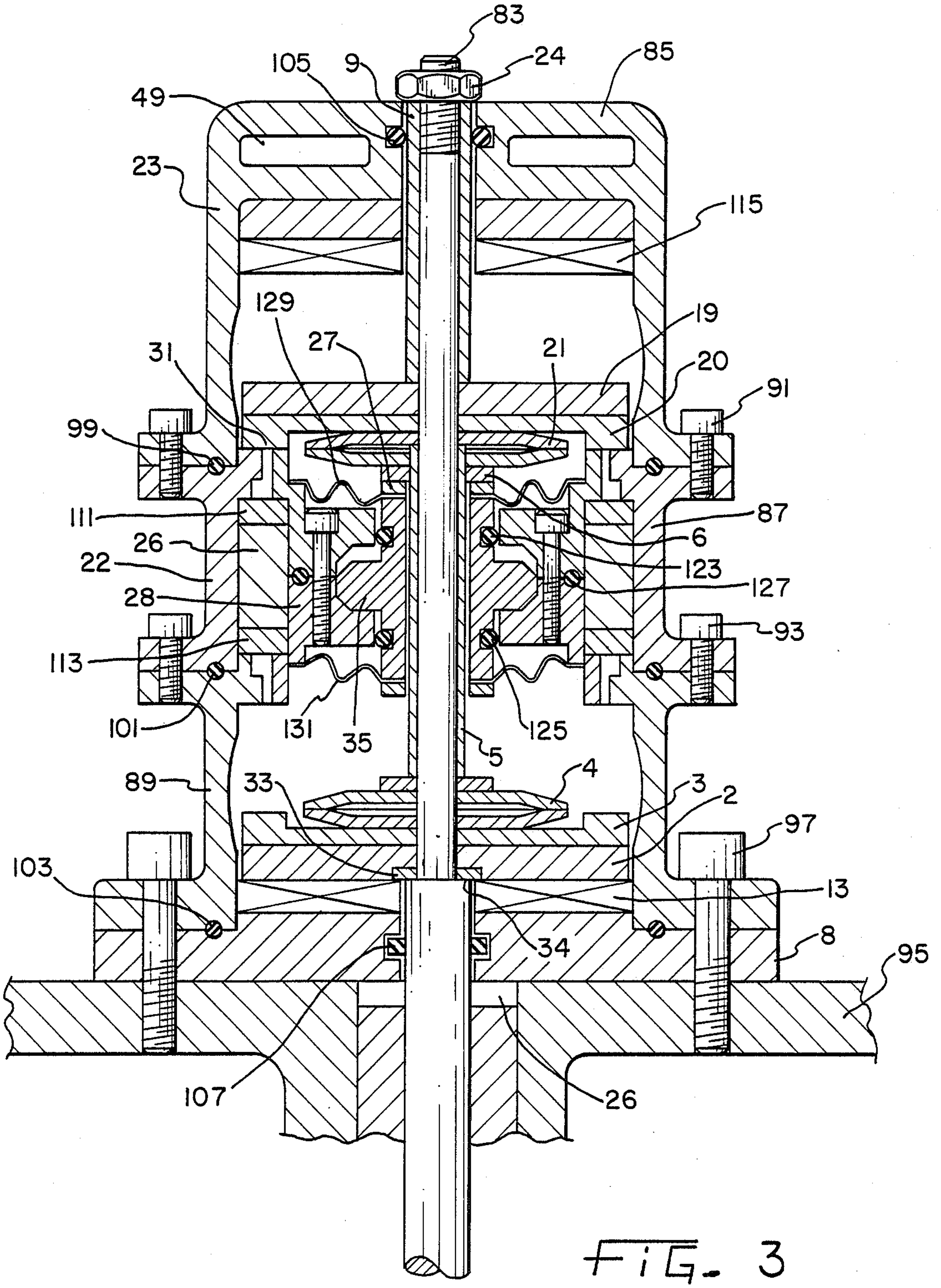
FIG. 3 is a view similar to FIG. 2, but showing the mechanism in a valve-open position.

In comparing FIGS. 1, 2 and 3, a gap 34 between a shoulder on the valve stem 17 and hardened washer 83 appears in FIG. 1 when the valve is closed, but not in FIGS. 2 or 8 where the valve is opening or opened. Gap 84 is on the order of five to ten one-thousandths of an inch and is provided to insure valve closure despite any differences in thermally induced expansion among the components. Gap 84 allows belleville washer or spring 4 to maintain an upward force on valve 1 against valve seat 117.

In many environments, such as the exemplary internal combustion engine, the bistable electromechanical transducer of the present invention may tend to operate at an excessive temperature and accordingly, the housing 23 that at least partially surrounds the movable armature (valve stem 17) includes a hollow region 49 (best seen in FIG. 4) having an inlet 47 and an outlet 45 for circulating a liquid coolant through a portion of the housing. Appropriate seals 133 perhaps formed as lobes on seals such as 99 may be provided. Exterior cooling fins past which air circulates or similar cooling schemes may be employed particularly in environments where a liquid coolant. such as from the conventional internal combustion engine coolant circulating system, is not readily available.

Figure 6:
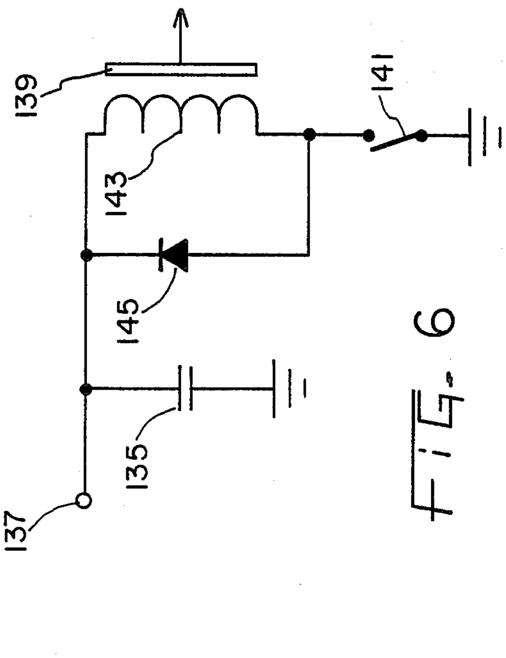
FIG. 6 is an electrical schematic diagram of a more simplistic alternative control circuit.

Coils 13 and 15 may be energized by a sudden surge of current from low impedance circuitry through silicon controlled rectifiers or linear switching devices as illustrated in FIG. 6, however, a presently preferred circuit in which the electrical circuitry includes a pair of individually enableable field effect transistors provides an additional advantage in that a further damping arrangement comprising one or both of the coils of the electromagnetic repulsion arrangements can be electrically connected for dynamic breaking and some energy recovery.

Referring briefly to FIG. 6, capacitor 135 is charged from a positive voltage source 137 When it is desired to repulse the plate or armature portion 139, switch 141 is closed and the current from capacitor 135 is sent into coil 143 inducing the desired opposing magnetic fields. When switch 141 is reopened, the current flow in coil 143 continues through diode 145 for a period of time until its stored energy is dissipated.

Figure 5:
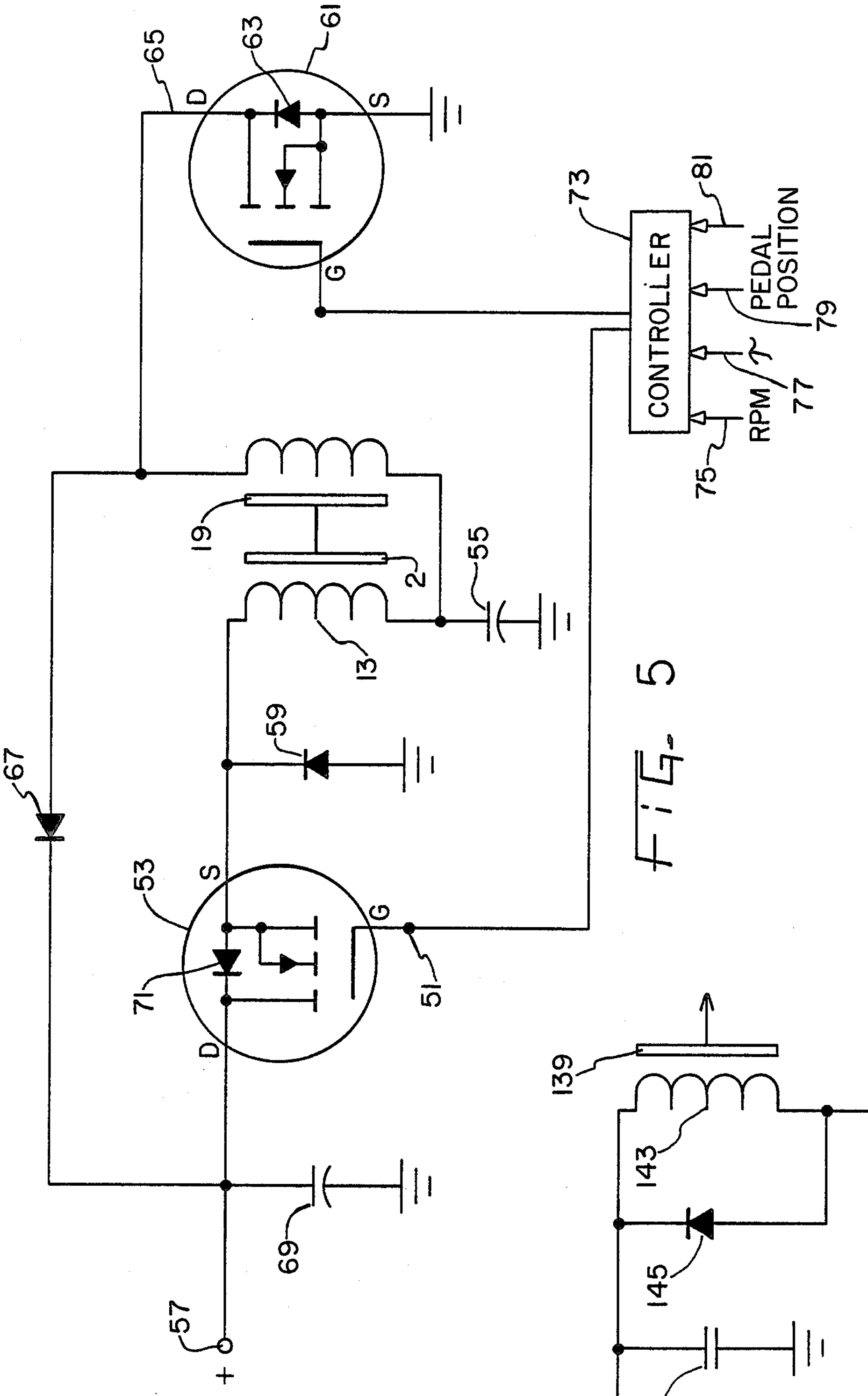
FIG. 5 is an electrical schematic diagram of one form of circuitry for controlling the valve of FIGS. 1–3.

In FIG. 5, the coils 13 and 15 are illustrated schematically adjacent their respective conductive plates 2 and 19. To initiate the transition from a valve-open position toward a valve-closed position, the gate 51 of field effect transistor 53 is pulsed or enabled for a short time causing current to flow from the positive source terminal 57 through coil 13 and into capacitor 55 partially charging that capacitor. The gate of transistor 58 is then disabled, however due to the inductively stored energy of coil 13, current flow in the coil (now through diode 59) and accumulation of charge on capacitor 55 continues for a period of time. During this time period, the energy stored in coil 18 is transferred to capacitor 55. The rapid build up of current in coil 13 induces opposite flowing current in the armature portion or plate 2, which is essentially a shorted single turn coil, and the interaction of the two fields is, in accordance with Lenz' Law, such as to repel the plate 2 with a great initial force. The motion of plate 2 away from coil 13 (after transistor 58 is turned off) provides an additional generator effect adding further to the charging of capacitor 55.

Plates 2 and 19 are mechanically connected together so as plate 2 retreats from coil 13, plate 19 is approaching coil 15. As plate 19 gets close to coil 15, field effect transistor 61 may be briefly enabled allowing current from capacitor 55 to flow through coil 15. This current in turn induces a current in plate 19 developing an associated magnetic field. As plate 19 closes on coil 15, this associated field causes a further current flow through diode 63 of transistor 61 further charging capacitor 55. Thus dynamic breaking in the form of conversion of mechanical energy of the motion of the valve into a charge on capacitor 55 is achieved.

When transistor 61 is gated on to propulse the armature portion 19 away from coil 15 and reopen the valve, current builds in coil 15 partially discharging capacitor 55. When transistor 61 is then turned off, the potential at its drain terminal 65 increases causing current to now flow through diode 67 and charge capacitor 69. This current is caused by the collapsing field in coil 15 and energy from that field as well as from the capacitor 55 is transferred to capacitor 69. As the valve nears its closed position, transistor 53 is briefly gated on causing a magnetic field associated with coil 18 and an induced current and field associated with the shorted turn 2. Since this plate o shorted turn 2 is approaching coil 18, the current in coil 18 reverses direction and still more of the charge on capacitor 55 and energy from the dynamic breaking of plate 2 is transferred by way of diode 71 in transistor 58 to the capacitor 69.

Enabling signals to the gates of the transistors 53 and 61 may be supplied at fixed times during the engine cycle, but preferably these signals are supplied at variable times under control of a microprocessor or controller 73 which may be dedicated to an individual valve or may be shared by a number of valves within the engine. This controller 73 is in turn responsive to numerous input engine operating parameters such as engine speed 75, engine torque 77, the accelerator pedal position 79 and other parameters as indicated by 81. In this manner, valves may be opened and closed at controllable points in the engine cycle as determined by the engine operating parameters at a particular time. Such variable valve timing and, as noted earlier, rapid opening and closing of the valve, gives rise to numerous advantages and improvements in engine operation.

In the conventional cam operated poppet valve the points in the engine cycle at which opening and closing commences is fixed, but the actual time required for the valve to move between closed and open positions depends on engine speed. With the valve arrangement of the present invention, movement between closed and open positions is very rapid and independent of engine speed, and the point in the cycle where such opening or closing commences is selectable. Since the time to open add the time to close is essentially constant, the dynamic effects are constant unlike the cam operated valve where the dynamics range over wide limits living rise to added problems.

Figure 7:
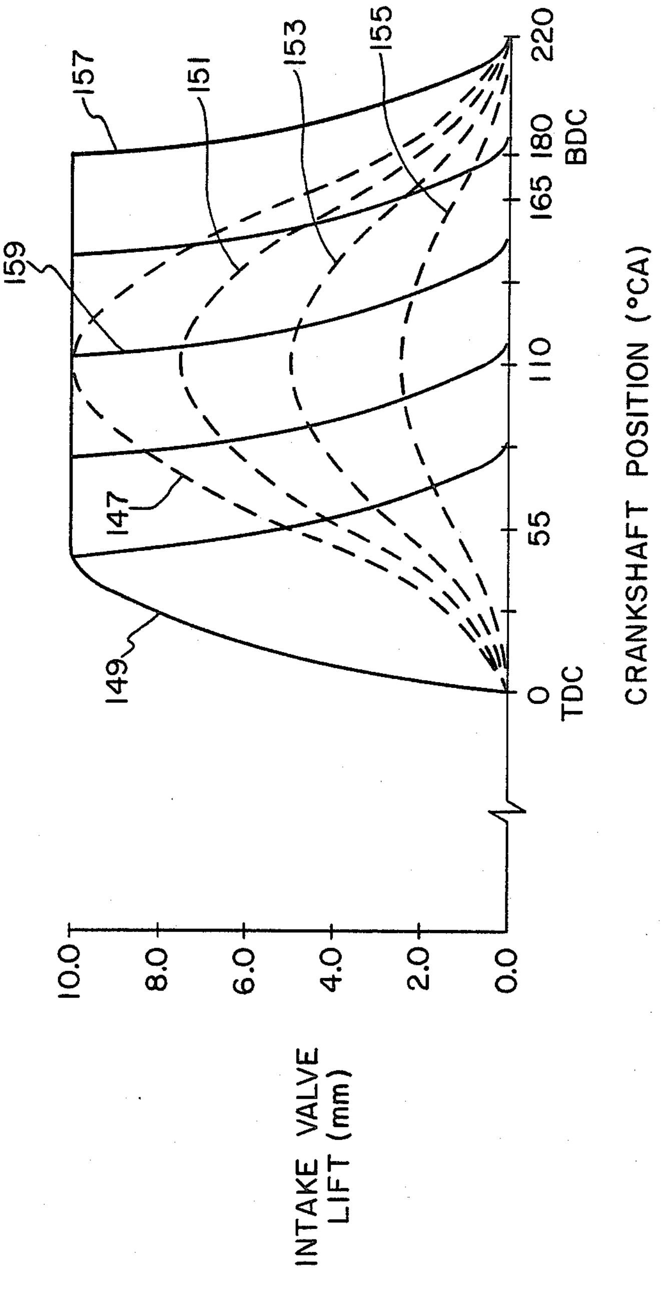
FIG. 7 is a graph illustrating the motion of the valve compared to conventional cam actuated valve motion.

The graph of FIG. 7 compares valve motion of a conventional cam actuated valve (curve 147) to motion of a valve actuated by the electromechanical transducer of the present invention (curve 149) both actuated at top dead center piston position and closing at 220 degrees beyond top dead center. Note that the early and late throttling effect of the conventional valve is eliminated by the rapid opening and closing of the valve arrangement of the present invention. Early tests using the circuitry of FIG. 6 indicated a 100 g valve carrying an additional 150 gm of moving parts of the present invention could be moved between open and closed positions in about 0.002 seconds and at an initial force of 300 lb. For each of the depicted cases, the valve actually opens about 0.4 inches or 10 mm., however, further curves at ¾, ½ and ¼ open throttle for a conventional engine are illustrated at 151, 153, and 155 respectively to illustrate the effect of carburetor throttling on the effective intake. With the present inventive valve arrangement, fuel injection with the manifold at essentially atmospheric pressure rather than conventional carburetion is contemplated and the valve can be closed at any preferred time along lines such as 157 or 159.

Thus, valve characteristics such as throttling, heat transfer, seating stress levels and damping can now be controlled, and valve timing optimized to maximize engine efficiency. Rapid valve operation will give rise to reduced pumping losses, increased volumetric efficiency, and increasing the length of the engine power stroke. In particular:

Instead of controlling the engine by throttling the intake manifold thereby operating the engine in a vacuum pump or variable intake density mode, the engine, and in particular the cylinder charge, may be controlled by governing the duration of time the intake valve is open followed by an adiabatic expansion and compression, thus reducing pumping losses.

Closing the intake valve at a precise point in the cycle will increase low engine speed torque by stopping the reverse flow of the intake mixture back into the intake manifold which occurs in conventionally valved engines at low RPM.

The sudden opening of the intake valve is advantageous in increasing turbulence and improving the mixing of fuel and air during the charging cycle.

More rapid opening of the exhaust valve will reduce the heretofor necessary lead time in starting exhaust blow down in the expansion stroke. The later opening of the exhaust valve extends the power stroke and reduces pumping losses.

The more rapid the opening and closing of the exhaust and intake valves, the higher the fluidynamic resonance Q factor, which will increase volumetric efficiency throughout the engine's operating range The more rapid opening of the exhaust valve will reduce heat transfer from the exhaust gases to the valve allowing the valve to run cooler, improving valve life; and the reduced exhaust gas quenching will reduce unburned hydrocarbon concentration in the exhaust.

The exhaust gases that are normally emitted near the end of the exhaust stroke are rich in unburned hydrocarbons due to scavenging unburned boundry layers close to the cooler combustion chamber walls. Rapid closing of the exhaust valve will retain more of these rich gases for reburning and may eliminate the need for the catalytic converter. The use of exhaust ga retention may also eliminate the present exhaust gas recirculating devices.

Precise electronic control of the opening and closing time of the valves allows a controlled under or overlap of intake and exhaust valves in various operating modes with a resulting reduction in undesirable emissions, helps maximize volumetric efficiency, and generally allows an optimization of the other abovenoted effects.

Such precise electronic control can facilitate a number of further modifications including All valves may be closed when the engine is not in use thereby eliminating exposure to the atmosphere and reducing corrosion within the combustion chambers.

Initial cranking to start the engine may be performed with intake valves maintained open and exhaust valves closed until cranking speed is sufficiently high. This provides a "compressionless" cranking as well a improved intake mixture mixing due to turbulence to aid cold weather starting.

Leaving the cylinders in appropriately charged states coupled with proper introduction of ignition spark to the appropriate cylinders allows the engine to be restarted without cranking when the engine has been stopped for a short time period, such as sitting at a stop light.

Control of the number of cylinders in use, as during steady state cruse on a highway, or other low demand condition allows the active cylinders to be operated more efficiently.

Reduction of unburned hydrocarbon emissions during deceleration is also possible. Conventionally valved engines develope high intake manifold vacuum during decelertion which enhances fuel evaporation o the manifold inner surface resulting in an overly rich mixture being burned. Further, the overly rich low density cylinder charge in the conventional engine may not ignite or burn as completely as it does under higher charge levels. Engines equipped with the present electronically controllable valve arrangement may be used to aid normal or rapid decelaration by closing selected valves for operation using fewer than the full complement of cylinders or no powered cylinders.

When greater deceleration of the vehicle is desired, the engine can be converted into a compressor mode. By changing the valve timing, the compressor may absorb more or less power. This would be controlled by the accellerator pedal and, under increased braking operation, by the brake foot pedal. The brake shoes would at last be employed to bring the vehicle to a complete halt.

When spark, fuel and valving are controlled, heat recovery by controlling air intake temperature is facilitated. For example, high heat recovery may be used when the combustion temperature is low as when operating the engine well below maximum torque. Such heat recovery may also help control combustibility under lean or high exhaust gas retention conditions. Ideally, the combustion temperature would be held to a predetermined maximum where one would have the best entropy position but yet controlled NOX production.

Reduced hydrocarbon emission results from less quenching at the exhaust valve, reduced exhaust gas blow-down time, lower emission at the end of the exhaust stroke as well as during deceleration, generally less valve overlap operation controlling the combustion temperature through use of heat recovery modulation, exhaust gas retention and controlling the air to fuel ratio. These combine to greatly reduce the need for catalytic converters.

General improvement in efficiency may be achieved by increased expansion of the power stroke gases resulting from the very rapid opening of the present valve arrangement. The conventional exhaust valve may begin to open at 45 degrees before bottom dead center and at approximately 60 psi gas pressure in order to achieve momentum of the gas mass necessary to evacuate the exhaust gases against a great deal of exhaust valve port throttling. The valve of the present invention opens more rapidly and completely, and may be opened at bottom dead center to utilize more of the expansion during the power stroke.

The unique configuration of the valve actuator facilitates initial assembly as well as dissembly for maintenance. The housing 23 is formed from three separable somewhat cylindrical parts, the upper closed ended cap 85, central housing portion 87 which also forms the upper portion of the outer pole piece 22, and lower housing portion 89 which also forms the lower portion of the outer pole piece 22. These three housing portions are joined by cap screws such as 91 and 93 and the housing in turn joined to the engine head or block 95 by further cap screws such as 97. A spacer block 8 supporting valve stem seal 107 is captured between the head or block 95 and housing portion 89. The joints between the several assembled sections are sealed by "0" rings 99, 101 and 103. To dissemble the bistable electromechanical transducer or valve actuator portion as depicted in FIG. 1, the nut 24 is loosened, relieving the normally compressed state of spring 4 which holds the valve closed against seat 117, and removed from the upper threaded portion 83 of valve stem 17. This frees the valve as well as tubular sleeve 9 and the tubular sleeve 9 may be pulled upwardly as viewed along the "0" ring seal 105 and out of the assembly. Similarly, the valve may be moved downwardly along the seal 107 and valve guide 109 and removed if desired and if the cylinder interior is accessible as by removing the engine head. When the several cap screws 91, 93 and 97 are removed, each housing portion and its associated components including the several impact washers or spacers 6, 27, 119 and 121 may be slid upwardly and off the valve stem 17. Optional flexible diaphragms 199 and 131 may be included for enhanced sealing of the hydraulic fluid in cavity 87 and diaphragm 129 must be removed or folded aside, if present, to access screws 115. Note that the permanent magnet 26 and the associated nonmagnetic spacers 111 and 113 are freed from captivity between housing portions 87 and 89 when the cap screws 93 are removed, while removal of screws 111 removes the inner pole piece 2B as well as freeing piston 85. Removal of screws 115, of course, breaks the seal maintained by "0" rings 123, 125 and 127 allowing the hydraulic fluid to drain from the cavity 37.

From the foregoing, it is now apparent that a novel bistable electromechanical transducer arrangement particularly suited to control internal combustion engine valves has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. An electronically controllable valve mechanism for use in an internal combustion engine comprising:

an engine valve having an elongated valve stem;

motive means for causing the valve to move in the direction of stem elongation between valve-open and valve-closed positions;

means for decelerating the valve as the valve nears one of said valve-open and valve-closed positions including at least two separate damping arrangements jointly effective to slow valve motion as the valve gets close to said one position;

a latching arrangement for maintaining the valve in one of said valve-open and valve-closed positions;

the motive means including an electromagnetic repulsion arrangement operable when energized to override the latching arrangement and dislodge the valve from the position in which the valve was maintained.

2. The electronically controllable valve mechanism of claim 1 wherein the electromagnetic repulsion arrangement includes a relatively fixed annular coil, an annular conductor movable with the valve stem and juxtaposed with the coil when the valve is in one of said valve-open and valve-closed positions, and electrical circuitry for providing a sudden current through the coil.

3. The electronically controllable valve mechanism of claim 2 wherein the electrical circuitry includes a pair of individually enableable field effect transistors.

4. The electronically controllable valve mechanism of claim 1 further comprising a housing at least partially surrounding the valve stem and means for circulating a liquid coolant through a portion of the housing.

5. The electronically controllable valve mechanism of claim 1 further comprising a housing at least partially surrounding the valve stem: the electromagnetic repulsion arrangement comprising first and second annular coils each fixed relative to the housing and surrounding the valve stem; and first and second spaced apart annular conductors surrounding and fixed to the valve stem, the first coil and first conductor being in juxtaposition when the valve is in the valve-open position and the second coil and second conductor being juxtaposed when the valve is in the valve-closed position.

6. The electronically controllable valve mechanism of claim 5 wherein said latching arrangement includes a permanent magnet fixed to the housing intermediate the first and second conductors, and first and second ferromagnetic members fixed to and movable with the valve stem, the valve being held in the valve-closed position by magnetic attraction between the magnet and the first ferromagnetic member and in the valve-open position by magnetic attraction between the magnetic and the second ferromagnetic member.

7. The electronically controllable valve mechanism of claim 6 wherein the permanent magnet is an annular member radially magnetized and further including inner and outer ferromagnetic pole pieces defining a first small annular air gap magnetic field which is shunted by the first ferromagnetic member when the valve is in the valve-closed position and a second small annular air gap magnetic field which is shunted by the second ferromagnetic member when the valve is in the valve-open position.

8. The electronically controllable valve mechanism of claim 1 wherein one of said damping arrangements comprises an axially compressible annular spring disk.

9. The electronically controllable valve mechanism of claim 8 wherein the annular spring is strained when the valve is in the valve-closed position to compensate for relative thermal expansion of the valve stem and insure valve closure.

10. The electronically controllable valve mechanism of claim 1 further comprising a housing at least partially surrounding the valve stem, one of said damping arrangements comprising a pneumatic damping arrangement including a housing region of reduced size and a piston fixed to the valve stem which enters the region of reduced size as the valve nears one of said valve-open and valve-closed positions.

11. The electronically controllable valve mechanism of claim 10 wherein the motive means comprises first and second annular coils each fixed relative to the housing and surrounding the valve stem; and first and second spaced apart annular conductors surrounding and fixed to the valve stem, the first coil and first conductor being in juxtaposition when the valve is in the valve-open position and the second coil and second conductor being juxtaposed when the valve is in the valve-closed position, said piston comprising one of said conductors.

12. The electronically controllable valve mechanism of claim 1 wherein one of said damping arrangements comprises a hydraulic damping arrangement including a fixed fluid filled cavity and a piston movable independent of the valve stem, the piston being impacted and driven from one cavity extreme to another cavity extreme as the valve nears one of said valve-open and valve-closed positions.

13. The electronically controllable valve mechanism of claim 1 wherein the motive means comprises a pair of like electromagnetic repulsion arrangements, one of said damping arrangements comprising one of said electromagnetic repulsion arrangements electrically connected for dynamic breaking.

14. An electronically controllable valve mechanism for use in an internal combustion engine comprising:

an engine valve having an elongated axial stem;

a housing at least partially surrounding the valve stem having a hollow interior generally shaped as a surface of revolution about the axis of the valve stem; and means within the housing and surrounding the valve stem for moving the valve along the stem axis between valve-open and valve-closed positions including in order along the stem;

a first annular coil fixed relative to the housing, a first conductor fixed to the valve stem, a first spring damping device, a hydraulic damping device including a fluid filled cavity fixed to the housing and a piston movable independent of the valve stem within the cavity, a second spring damping device, a second conductor fixed to the valve stem, a second annular coil fixed relative to the housing.

15. The electronically controllable valve mechanism of claim 14 further comprising a latching arrangement for maintaining the valve in one of said valve-open and valve-closed positions including a first ferromagnetic member intermediate the first conductor and the first spring damping device, a second ferromagnetic member intermediate the second conductor and the second spring damping device, and first and second small annular air gap magnetic poles intermediate the first and second ferromagnetic members and fixed relative to ±he housing, the first poles being shunted by the first ferromagnetic member when the valve is in the valve-closed position and the second poles being shunted by the second ferromagnetic member when the valve is in the valve-open position.

16. An electronically controllable valve mechanism for use in an internal combustion engine comprising:

an engine valve having an elongated valve stem;

a housing at least partially surrounding the valve stem;

means for circulating a liquid coolant through a portion of the housing;

motive means for causing the valve to move in the direction of stem elongation between valve-open and valve-closed positions;

means for decelerating the valve as the valve nears one of said valve-open and valve-closed positions including at least two separate damping arrangements jointly effective to slow valve motion as the valve gets close to said one position;

a latching arrangement for maintaining the valve in one of said valve-open and valve-closed positions;

the motive means comprising an electromagnetic repulsion arrangement operable when energized to override the latching arrangement and dislodge the valve from the position in which the valve was maintained.

17. The electronically controllable valve mechanism of claim 16 wherein the electromagnetic repulsion arrangement includes a relatively fixed annular coil, an annular conductor movable with the valve stem and juxtaposed with the coil when the valve is in one of said valve-open and valve-closed positions, and electrical circuitry for providing a sudden current through the coil.

18. The electronically controllable valve mechansim of claim 17 wherein the electrical circuitry includes a pair of individually enableable field effect transistors.

19. The electronically controllable valve mechanism of claim 16 wherein one of said damping arrangements comprises an axially compressible annular spring disk.

20. The electronically controllable valve mechanism of claim 19 wherein the annular spring is strained when the valve is in the valve-closed position to compensate for relative thermal expansion of the valve stem and insure valve closure.

21. The electronically controllable valve mechanism of claim 16 further comprising a housing at least partially surrounding the valve stem, one of said damping arrangements comprising a pneumatic damping arrangement including a housing region of reduced size and a piston fixed to the valve stem which enters the region of reduced size as the valve nears one of said valve-open and valve-closed positions.

22. The electronically controllable valve mechanism of claim 21 wherein the electromagnetic repulsion arrangement comprises first and second annular coils each fixed relative to the housing and surrounding the valve stem; and first and second spaced apart annular conductors surrounding and fixed to the valve stem, the first coil and first conductor being in juxtaposition when the valve is in the valve-open position and the second coil and second conductor being juxtaposed when the valve is in the valve-closed position, said piston comprising one of said conductors.

23. The electronically controllable valve mechanism of claim 16 wherein one of said damping arrangements comprises a hydraulic damping arrangement including a fixed fluid filled cavity and a piston movable independent of the valve stem, the piston being impacted and driven from one cavity extreme to another cavity extreme as the valve nears one of said valve-open and valve-closed positions.

24. The electronically controllable valve mechanism of claim 16 wherein the motive means comprises a pair of like electromagnetic repulsion arrangements, one of said damping arrangements comprising one of said electromagnetic repulsion arrangements electrically connected for dynamic breaking.

* * * * *